US010351341B2

(12) United States Patent
Whitfield, Jr. et al.

(10) Patent No.: US 10,351,341 B2
(45) Date of Patent: Jul. 16, 2019

(54) EXTERNALLY CONTROLLED SWITCH MECHANISM

(71) Applicant: The Heil Co., Chattanooga, TN (US)

(72) Inventors: Ralph Waldo Whitfield, Jr., Rainbow City, AL (US); Brian H. Ham, Huntsville, AL (US); Albert Jiang, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 15/906,041

(22) Filed: Feb. 27, 2018

(65) Prior Publication Data

US 2018/0251296 A1 Sep. 6, 2018

Related U.S. Application Data

(63) Continuation of application No. 15/594,819, filed on May 15, 2017, now Pat. No. 9,926,135, which is a continuation of application No. 15/227,452, filed on Aug. 3, 2016, now Pat. No. 9,682,820, which is a continuation of application No. 13/833,779, filed on Mar. 15, 2013, now Pat. No. 9,428,128.

(60) Provisional application No. 61/711,482, filed on Oct. 9, 2012.

(51) Int. Cl.

| | |
|---|---|
| ***G06F 7/00*** | (2006.01) |
| ***B65F 3/06*** | (2006.01) |
| ***B65F 3/10*** | (2006.01) |
| ***B60R 16/08*** | (2006.01) |
| *B65F 3/02* | (2006.01) |

(52) U.S. Cl.
CPC ................ *B65F 3/06* (2013.01); *B60R 16/08* (2013.01); *B65F 3/10* (2013.01); *B65F 2003/025* (2013.01); *B65F 2003/0279* (2013.01)

(58) Field of Classification Search
None
See application file for complete search history.

(56) References Cited

U.S. PATENT DOCUMENTS

| | | | |
|---|---|---|---|
| 4,219,298 | A | 8/1980 | Stragier et al. |
| 5,470,187 | A | 11/1995 | Smith et al. |
| 5,601,391 | A | 2/1997 | Gazza |
| 5,601,392 | A | 2/1997 | Smith et al. |
| 5,743,698 | A | 4/1998 | Smith et al. |
| 5,851,100 | A | 12/1998 | Brandt |
| 5,890,865 | A | 4/1999 | Smith et al. |
| 5,967,731 | A | 10/1999 | Brandt |
| 6,152,673 | A | 11/2000 | Anderson et al. |
| 6,226,582 | B1 | 5/2001 | Adsett et al. |

(Continued)

*Primary Examiner* — Yolanda R Cumbess
(74) *Attorney, Agent, or Firm* — Fish & Richardson P.C.

(57) ABSTRACT

A control mechanism for a refuse vehicle includes a first control valve that operates a first hydraulically controlled mechanism and a second control valve that operates a second hydraulically controlled mechanism. The control mechanism also includes a plurality of switches and a pneumatic control mechanism. The plurality of switches generates a valve select signal and a mode signal. The pneumatic control mechanism selectively controls the first control valve and the second control valve based on the valve select signal and the mode signal. An operator of the refuse vehicle actuates the plurality of switches while the operator is operating the pneumatic control mechanism.

20 Claims, 3 Drawing Sheets

(56) References Cited

U.S. PATENT DOCUMENTS 7,070,381 B2 * 7/2006 Khan ..................... B60P 1/006
298/22 C
7,559,732 B2 7/2009 Khan et al.
7,559,733 B2 7/2009 Khan et al.
7,559,734 B2 7/2009 Khan et al.
7,681,340 B2 3/2010 Treuthardt
7,831,352 B2 11/2010 Laumer et al.
7,937,162 B2 5/2011 Thomson et al.
8,078,297 B2 12/2011 Lasher et al.
8,191,363 B2 6/2012 Laumer et al.
9,428,128 B2 8/2016 Whitfield, Jr. et al.
9,682,820 B2 6/2017 Whitfield, Jr. et al.
2002/0182044 A1 12/2002 Yu
2008/0141805 A1 6/2008 Birk et al.
2013/0291530 A1 * 11/2013 Bang .................... E02F 9/2292
60/428
2014/0097370 A1 4/2014 Whitfield, Jr. et al.
2014/0167494 A1 6/2014 Jeon
2016/0340121 A1 11/2016 Whitfield
2017/0247186 A1 8/2017 Whitfield, Jr. et al.

* cited by examiner

EXTERNALLY CONTROLLED SWITCH MECHANISM

CROSS-REFERENCE TO RELATED APPLICATIONS

This application is a continuation of U.S. patent application Ser. No. 15/594,819, filed on May 15, 2017, which is a continuation of U.S. patent application Ser. No. 15/227,452, filed on Aug. 3, 2016, which is a continuation of U.S. patent application Ser. No. 13/833,779, filed on Mar. 15, 2013, which claims the benefit of U.S. Provisional Application No. 61/711,482, filed on Oct. 9, 2012. The entire disclosures of the above applications are incorporated herein by reference.

FIELD

The present disclosure relates to refuse vehicles and an externally controlled switch mechanism for the same.

BACKGROUND

This section provides background information related to the present disclosure which is not necessarily prior art.

Refuse vehicles play a key role in dispensing of refuse by traversing an area, stopping at a location where the user, resident, commercial business, or the like has deposited refuse for collection, depositing the refuse in the refuse vehicle, and transporting the refuse to a processing center, such as a recycling center, landfill, or incineration center. With a continuing need to increase vehicle operator efficiency, there has been a growing trend to optimize operations within the refuse vehicle. For example, an operator may utilize a control mechanism to operate a fork lift of the refuse vehicle many times during a refuse collection cycle. The operator may have to engage a separate control mechanism to operate a carry can loader of the vehicle, causing the operator to have to change hand positions to do so. Accordingly, a system designed to increase the efficiency of the operator's movements is desirable.

SUMMARY

This section provides a general summary of the disclosure, and is not a comprehensive disclosure of its full scope or all of its features.

A refuse vehicle system for operating a plurality of lifting devices includes a single control mechanism for lifting the plurality of lifting devices. The system further includes a plurality of control switches. The plurality of control switches is arranged to select one of the plurality of lifting devices. The selected plurality of lifting devices is then operated by the single control mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
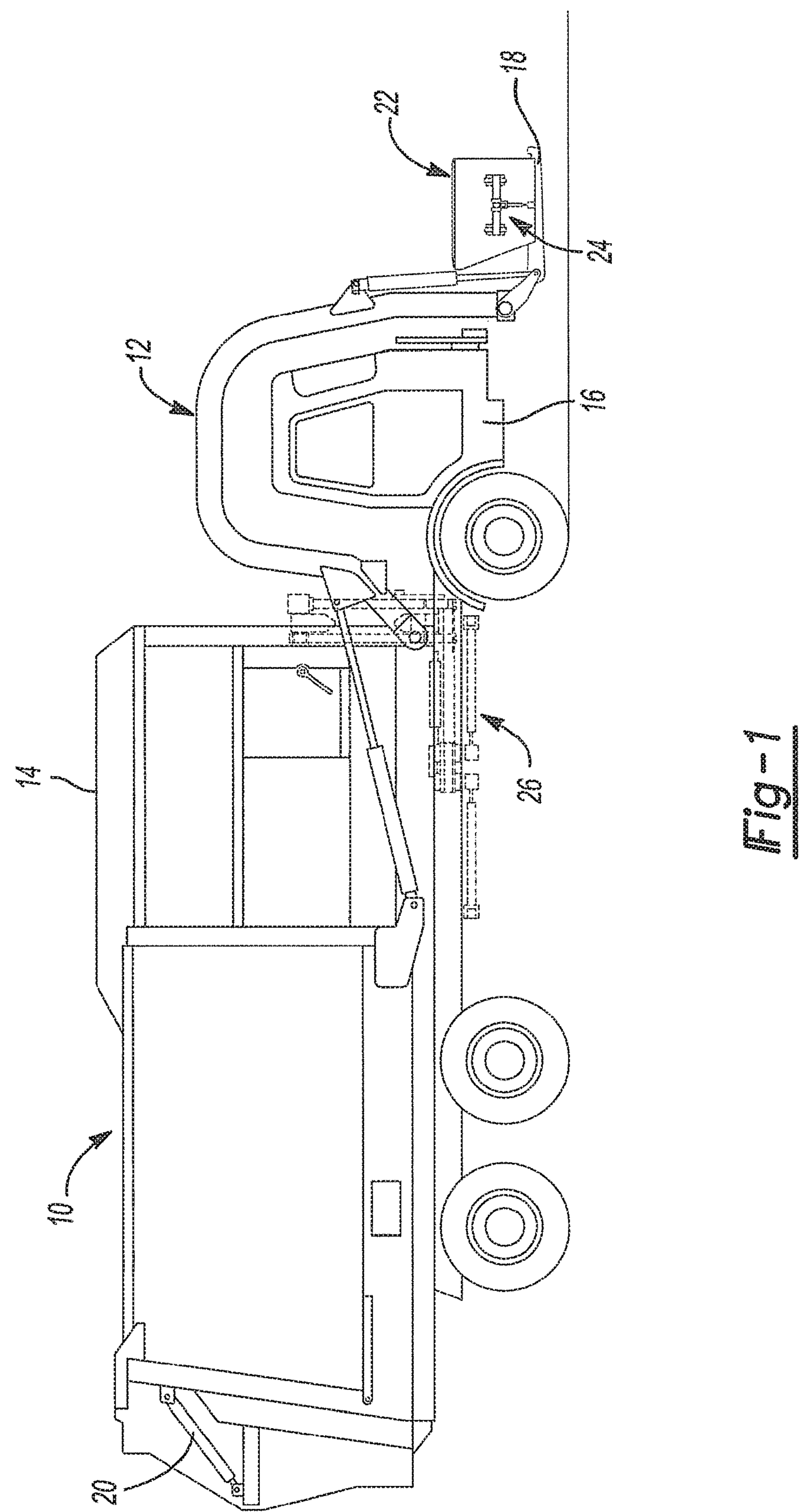
FIG. 1 is a side view of a front loading refuse vehicle having an externally controlled switch mechanism.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

FIG. 1 depicts a side view of a front loading refuse vehicle 10 arranged in accordance with various embodiments. Vehicle 10 is arranged as a front loading refuse vehicle and includes a front loading lift arm assembly 12 which connects to a front portion of a container or bin 14 and extends from behind the operator cab 16 to in front of the operator cab 16. Front loading lift arm assembly 12 includes a fork mechanism 18 which can be deployed to a generally horizontal position for engaging corresponding passages in an on-site refuse container 22. Once fork mechanism 18 has engaged the container 22, lift arm assembly 12 is pivoted upwardly and rearwardly to invert the container 22 and dispose the contents into vehicle container 14 via a hopper. Refuse vehicle 10 may also include a compaction mechanism 20 which compacts refuse within container 14 to allow more refuse to be disposed therein. The vehicle 10 may also include a container, such as a carry can loader that includes a loader arm 24. In another embodiment, the vehicle 10 may include a side arm loader 26.

Figure 2:
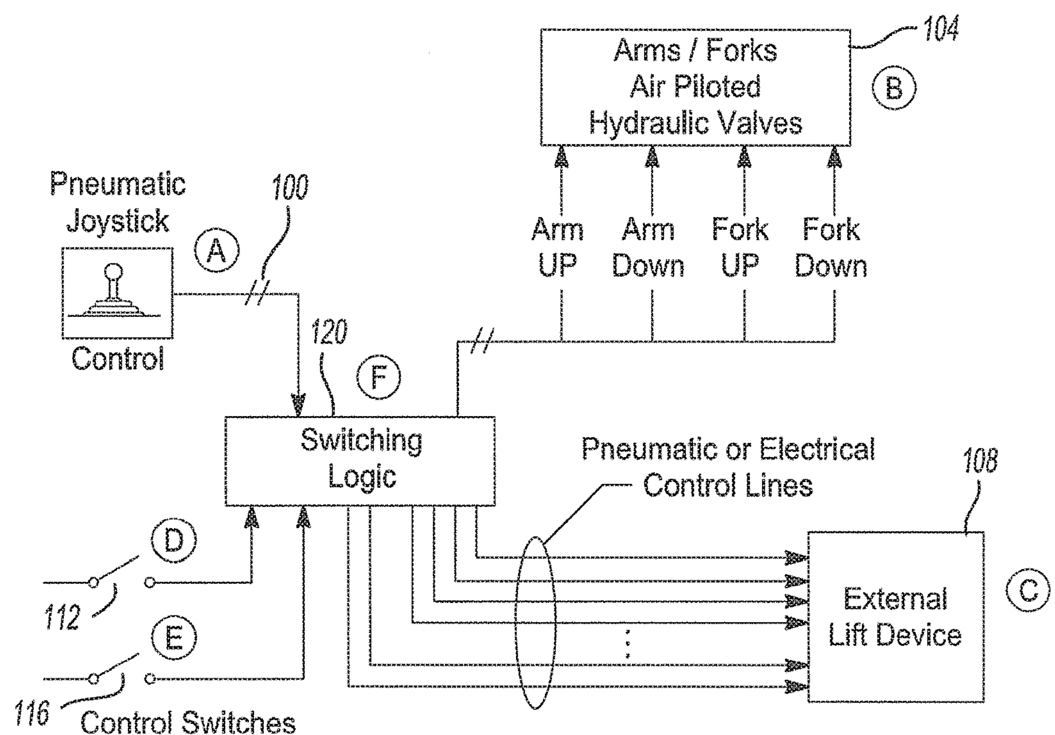
FIG. 2 is a block diagram of an externally controlled switch mechanism system for a front loading refuse vehicle according to various embodiments.

As will be described in greater detail and shown schematically in FIG. 2, refuse vehicle 10 may include a control mechanism (such as a pneumatic joystick control 100 as shown in FIG. 2) for controlling the fork mechanism 18 and the front loading lift arm assembly 12 and for controlling the carry can loader arm 24. Alternatively, the joystick control 100 may also control the side arm loader 26. The control mechanism is further arranged so an operator of the vehicle 10 can operate at least one of the fork mechanism 18 and the lift arm assembly 12.

The fork mechanism 18 and the lift arm assembly 12 may be operated in either manual mode or automatic mode. For example, when the fork mechanism 18 is operated in manual mode the fork mechanism 18 is pneumatically operated. Conversely, when the fork mechanism 18 is operated in automatic mode, the fork mechanism 18 is electrically operated. The control mechanism may be arrange to select at least one of the fork mechanism 18 and the lift arm assembly 12 and the control mechanism may be further arranged to select at least one of the manual mode and the automatic mode of the fork mechanism 18 and the lift arm assembly 12.

Referring now to FIG. 2, a block diagram of an externally controlled switch mechanism system is shown. An operator of the vehicle 10 utilizes a pneumatic joystick control 100 that controls a primary control valve 104. The primary control valve 104 may be an air-piloted hydraulic or electrically operated control valve that will control one of at least four functions of a hydraulically controlled machine. The at least four functions include, but are not limited to, lift, lower, forward, and tilt. For example, the primary control valve 10 may control one of the fork mechanism 18 and the lift arm assembly 12. The primary control valve 104 may receive instructions from the pneumatic joystick control 100 to operate the fork mechanism 18 and the lift arm assembly 12. For example, the operator utilizes the pneumatic joystick control 100 to instruct the primary control valve 104 to lift the fork mechanism 18. The operator also controls a secondary control valve 108 with the same control mechanism.

The secondary control valve 108 may be a second air-piloted hydraulic or electrically operated control valve that will control a hydraulically controlled machine, such as a refuse can loader. For example, the secondary control valve 108 may control the carry can loader arm 24 located on the exterior of the vehicle 10. The operator utilizes the pneumatic joystick control 100 to instruct the secondary control valve 108 to operate the carry can loader arm 24. In another embodiment, the second control valve 108 may control the side arm loader 26. The carry can loader arm 24 may be arranged to include a plurality of functions. The plurality of functions includes, but is not limited to, an extend function, a retract function, a raise function, a lower function, a grab function, and a release function. The primary control valve 104 may be controlled in a manual mode and an automatic mode. Conversely, the secondary control valve 108 may only be operated in manual mode.

When the pneumatic joystick control 100 is utilized to operate the primary control valve 104, fluid is pumped to the primary control valve 104 from within the vehicle 10. The fluid is pumped to the primary control valve 104 to apply a force on the primary control valve 104. The force on the primary control valve 104 causes the primary control valve 104 to operate. For example, the force on the primary control valve 104 causes the fork mechanism 18 to lift. Similarly, when the force is removed from the primary control valve 104, the fork mechanism 18 is lowered. When the pneumatic joystick control 100 is utilized to operate the secondary control valve 108, fluid is pumped to the secondary control valve 108 from within the vehicle 10. The fluid is pumped to the secondary control valve 108 to apply a force on the secondary control valve 108. The force on the secondary control valve 108 causes the secondary control valve 108 to operate. For example, the force applied to the secondary control valve 108 causes the carry can loader arm 24 to lift. Similarly, when the force is removed from the secondary control valve 108, the carry can loader arm 24 is lowered.

The operator actuates remotely mounted switches 112 and 116 to selectively control which of the primary control valve 104 and the secondary control valve 108 the pneumatic joystick control 100 will control and whether the pneumatic joystick control 100 will operating in one the manual mode or the automatic mode. The remotely mounted switches 112 and 116 can be mounted in various locations such as on a floor of the vehicle 10 as a plurality of foot-operated switches or on a steering wheel of the vehicle 10 as a plurality of hand-operated switches. In another embodiment, the remotely mounted switches 112 and 116 may be mounted on the pneumatic joystick control 100. The remotely mounted switches 112 and 116 are arranged so that the operator may actuate one of the remotely mounted switches 112 and 116 without releasing control of the pneumatic joystick control 100 in order to selected between the primary control valve 104 and the secondary control valve 108 and to selectively change the mode of operation of the primary control valve 104.

The pneumatic joystick control 100 and the remotely mounted switches 112 and 116 communicate with a switching control module 120. The switching control module 120 may include, but is not limited to, logic devices such as relays, pressure switches, air-solenoid valves, or other logic-based equipment such as Programmable Logic Controllers (PLCs) or any combination thereof. The switching control module 120 receives a control signal one of the remotely mounted switches 112 and 116.

For example, when the operator actuates the remotely mounted switch 112 to a first position, the switching control module 120 receives a control signal indicative of the primary control valve 104 being selected for control by the pneumatic joystick control 100 in the manual mode. The operator may then utilize the pneumatic joystick control 100 to operate the primary control valve 104 in manual mode. Further, the operator may actuate the remotely mounted switch 116 to an automatic control position when the remotely mounted switch 112 is in the first position. The switching control module 120 receives a control signal indicative of the primary control valve 104 being selected for control by the pneumatic joystick control 100 in the automatic mode. The operator may then utilize the pneumatic joystick control 100 to operate the primary control valve 104 in automatic mode.

When the operator actuates the remotely mount switch 112 to a second position, the switching control module 120 receives a control signal indicative of the secondary control valve 108 being selected for control by the pneumatic joystick control 100 in the manual mode. The operator may then utilize the pneumatic joystick control 100 to operate the secondary control valve 108 in manual mode.

In another embodiment, the switching control module 120 may combine and separate fluid flow to operate the primary control valve 104 and the secondary control valve 108. For example, when the primary control valve 104 is not being operated, the switching control module 120 separates flow from a first pump and a second pump of the vehicle 10. The switching control module 120 then directs a first portion of fluid from the first pump to the secondary control valve 108. The switching control module 120 then directs a second portion of the fluid from the second pump to a return filter. In another embodiment, the switching control module 120 may direct the second portion of fluid to pump suction of the vehicle 10.

When the secondary control valve 108 is being operated, the switching control module 120 shuts off a first pressure line to the primary control valve 104 in order to deactivate the primary control valve 104. This may be done as a safety measure when the can carry loader is being operated. When the secondary control valve 108 is being operated, the primary control valve 104 does not required fluid in order to operate (i.e., because the primary control valve 104 is stationary when it is not being operated).

Similarly, when the primary control valve 104 is being operated, the switching control module 120 shuts off a second pressure line to secondary control valve 108 in order to deactivate the secondary control valve 108. This may be done as a safety measure and to prevent the carry can loader arm 24 from drifting due to a force remaining on the carry can loader arm 24. The fluid to the secondary control valve 108 is redirected to the primary control valve 104. The switching control module 120 may combine flow from both of the first pump and the second pump to the primary control valve 104. In this way, all of the fluid from the first pump and the second pump is directed to the primary control valve 104 (i.e., no fluid is directed to the return filter). This may be done in order to minimize energy consumption of the vehicle 10. When the primary control valve 104 is being operated, the second control valve 108 does not required fluid in order to operate (i.e., because the second control valve 108 is stationary when it is not being operated).

In another embodiment, the switching control module 120 may shut off the first pressure line and the second pressure line while the primary control valve 104 and the secondary control valve 108 are not in use. For example, when the vehicle 10 is being driven on a road, the switching control module 120 shuts off the first pressure line and the second pressure line. When the switching control module 120 shuts off the first pressure line and the second pressure line, the primary control valve 104 and the secondary control valve 108 are deactivated. The switching control module 120 will direct the fluid from the first pump and the second pump to the return filter or to the pump suction of the vehicle 10. In this way, the first pump and the second pump and functioning at a low pressure, minimizing an overall energy required to operate the vehicle 10.

Figure 3:
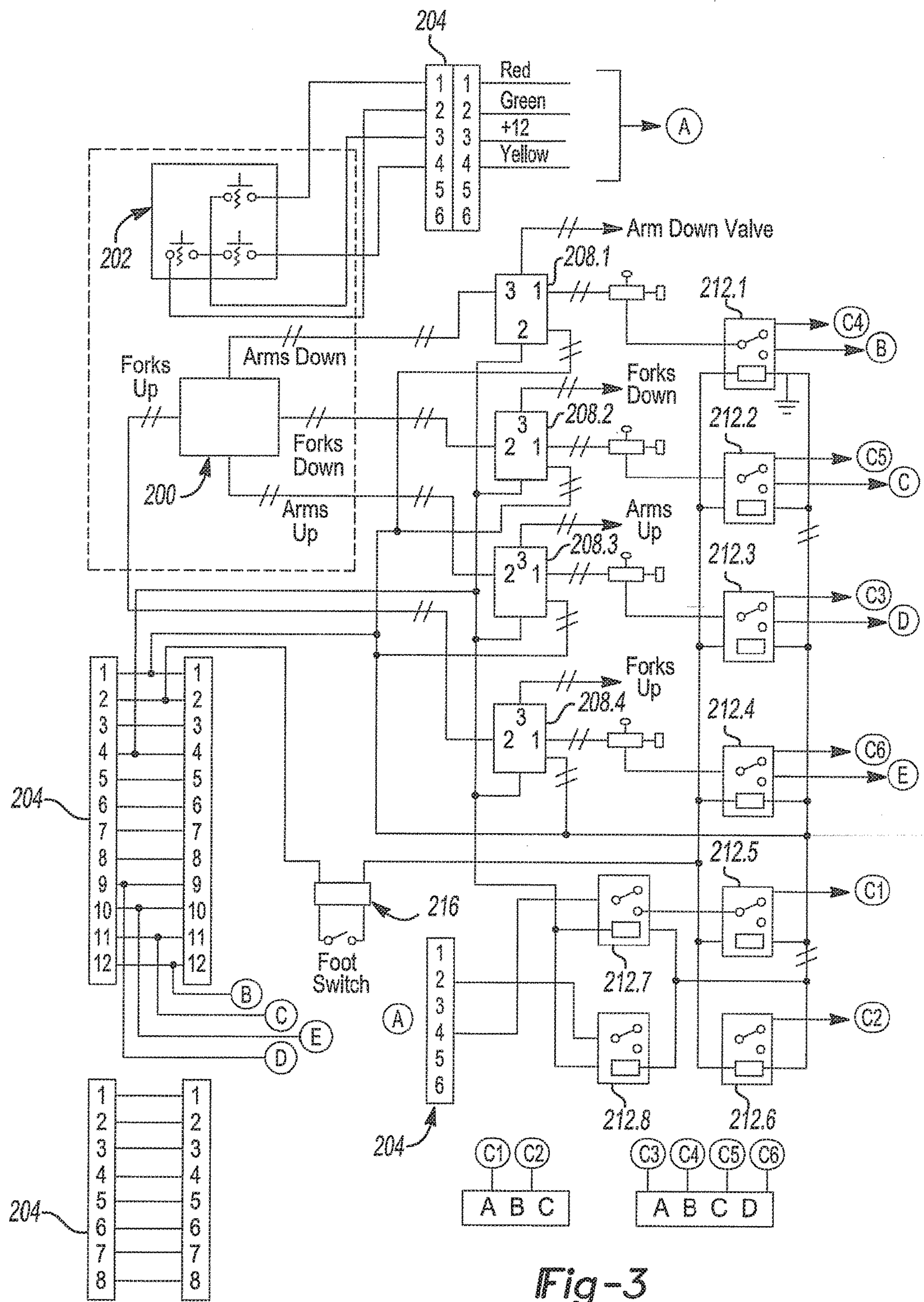
FIG. 3 is a schematic diagram of an externally controlled switch mechanism system.

Referring now to FIG. 3, a schematic diagram of an externally controlled switch mechanism system is shown. The system may include a pneumatic control box 200 and a control switch box 202. The pneumatic control box 200 is arranged to control the fork mechanism 18 and the lift arm assembly 12. For example, the pneumatic control box 200 includes similar functionality as the pneumatic joystick control 100. The control switch box 202 includes a plurality of control switches. Each of the plurality of control switches is arranged to selectively generate an electrical signal. The electrical signal is indicative of whether the operator is controlling the primary control valve 104 in the manual mode or the automatic mode. For example, the control switch box 202 includes similar functionality to the remotely mounted switches 112 and 116.

The system further includes a plurality of connectors 204, a plurality of pneumatically controlled relays 208.1, 208.2, 208.3, 208.4 (collectively relays 208), and a plurality of electrically actuated switches 212.1, 212.2, 212.3, 212.4, 212.5, 212.6, 212.7, and 212.8 (collectively electronic switches 212). The control switch box 202 is electrically coupled to electronic switches 212 through the plurality of connectors 204. When one of the plurality of control switches of the control switch box 202 is actuated, the control switch box 202 communicates a control signal to one of the plurality of connectors 204. The one of the plurality of connectors 204 is electrically coupled to one of the plurality of electronic switches 212.

The one of the plurality of electronic switches 212 is arranged to generate an output signal based on the control signal. For example, when the operator desires to operate the primary control valve 104 in manual mode, the operator may actuate one of the plurality of control switches of the control switch box 202. The one of the plurality of control switches is electrically coupled with one of the plurality of connectors 204. The one of the plurality of connectors 204 is electrically coupled to one of the electrical switches 212, for example electrical switch 212.1. The electrical switch 212.1 is arranged to send an electrical signal to the primary control valve 104 indicating the operator has selected the manual mode. The operator may then use the pneumatic control box 200 to operate the primary control valve 104 in the manual mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refuse vehicle comprising:
a first control valve configured to control one or more operations of a lift arm assembly and fork mechanism of the refuse vehicle;
a second control valve configured to control one or more operations of a loader arm coupled to a carry can loader of the refuse vehicle;
one or more switches configured to generate a valve select signal and a mode signal; and
a control system configured to:
selectively control the first control valve and the second control valve based on the valve select signal and the mode signal; and
actuate the one or more switches to selectively generate:
a first valve select signal and a first mode signal, such that the control system controls the first control valve in a manual mode; and
a second valve select signal and a second mode signal, such that the control system controls the first control valve in an automatic mode.

2. The refuse vehicle of claim 1, wherein the one or more switches are coupled to the control system.

3. The refuse vehicle of claim 1, wherein the control system is further configured to actuate the one or more switches to selectively generates a third valve select signal and a third mode signal.

4. The refuse vehicle of claim 3, wherein the control system selectively controls the second valve in a manual mode based on the third valve select signal and the third mode signal.

5. The refuse vehicle of claim 1, wherein the one or more operations controlled by the first control valve comprise lift, lower, move forward, and tilt operations of the lift arm assembly and the fork mechanism.

6. The refuse vehicle of claim 5, wherein the one or more operations controlled by the second control valve comprise extend, retract, raise, lower, grab, and release operations of the loader arm.

7. The refuse vehicle of claim 1, wherein the control system comprises a joystick configured to control the first control valve and the second control valve.

8. The refuse vehicle of claim 7, wherein each of the first and second control valves comprises one of an air-piloted hydraulic control valve or an electrically operated control valve.

9. The refuse vehicle of claim 7, wherein the joystick comprises a pneumatic joystick.

10. The refuse vehicle of claim 7, wherein at least one of the one or more switches is mounted on the refuse vehicle remotely from the joystick.

11. The refuse vehicle of claim 10, wherein the at least one switch comprises an electrical switch.

12. The refuse vehicle of claim 10, wherein the at least one switch is configured to be actuated by the control system while a user grasps the joystick.

13. A refuse vehicle comprising:
a first control valve configured to control one or more operations of a lift arm assembly and fork mechanism of the refuse vehicle;
a second control valve configured to control one or more operations of a loader arm coupled to a carry can loader of the refuse vehicle;
one or more switches configured to generate a valve select signal and a mode signal; and
a control system comprising a joystick, the control system configured to:
selectively control the first control valve and the second control valve based on the valve select signal and the mode signal; and
actuate the one or more switches to selectively generate:
a first valve select signal and a first mode signal, such that the control system controls the first control valve in a manual mode;
a second valve select signal and a second mode signal, such that the control system controls the first control valve in an automatic mode; and
a third valve select signal and a third mode signal, such that the control system controls the second control valve in a manual mode.

14. The refuse vehicle of claim 13, wherein each of the first and second control valves comprises one of an air-piloted hydraulic control valve or an electrically operated control valve.

15. The refuse vehicle of claim 13, wherein the joystick comprises a pneumatic joystick.

16. The refuse vehicle of claim 13, wherein at least one of the one or more switches is mounted on the refuse vehicle remotely from the joystick.

17. The refuse vehicle of claim 16, wherein the at least one switch comprises an electrical switch.

18. The refuse vehicle of claim 16, wherein the at least one switch is configured to be actuated by the control system while a user grasps the joystick.

19. A refuse vehicle comprising:
a first control valve configured to control lift, lower, move forward, and tilt operations of a lift arm assembly and fork mechanism of the refuse vehicle;
a second control valve configured to control extend, retract, raise, lower, grab, and release operations of a loader arm coupled to a carry can loader of the refuse vehicle;
one or more switches configured to generate a valve select signal and a mode signal; and
a control system comprising a joystick, the control system configured to:
selectively control the first control valve and the second control valve based on the valve select signal and the mode signal; and
actuate the one or more switches to selectively generate:
a first valve select signal and a first mode signal, such that the control system controls the first control valve in a manual mode; and
a second valve select signal and a second mode signal, such that the control system controls the first control valve in an automatic mode,
wherein at least one of the one or more switches comprises an electrical switch mounted on the refuse vehicle remotely from the joystick, and
wherein the at least one switch is configured to be actuated by the control system while a user grasps the joystick.

20. The refuse vehicle of claim 19, wherein the control system is further configured to actuate the one or more switches to selectively generate a third valve select signal and a third mode signal, and wherein the control system selectively controls the second valve in a manual mode based on the third valve select signal and the third mode signal.

* * * * *